(No Model.)

S. J. DECKARD.
PENDULUM LEVEL.

No. 328,881. Patented Oct. 20, 1885.

WITNESSES
O. W. Dashiell
J. W. Garner

INVENTOR
Stephen J. Deckard
By C. A. Snow & Co.
Attorneys

UNITED STATES PATENT OFFICE.

STEPHEN JAMES DECKARD, OF LOGANSPORT, INDIANA, ASSIGNOR OF ONE-HALF TO JACOB J. PUTERBAUGH, OF SAME PLACE.

PENDULUM-LEVEL.

SPECIFICATION forming part of Letters Patent No. 328,881, dated October 20, 1885.

Application filed February 27, 1885. Serial No. 157,253. (No model.)

*To all whom it may concern:*

Be it known that I, STEPHEN J. DECKARD, a citizen of the United States, residing at Logansport, in the county of Cass and State of Indiana, have invented a new and useful Improvement in Levels, of which the following is a specification, reference being had to the accompanying drawings.

My invention relates to an improvement in levels; and it consists in the peculiar construction and combination of devices, that will be more fully set forth hereinafter.

Figure 1:
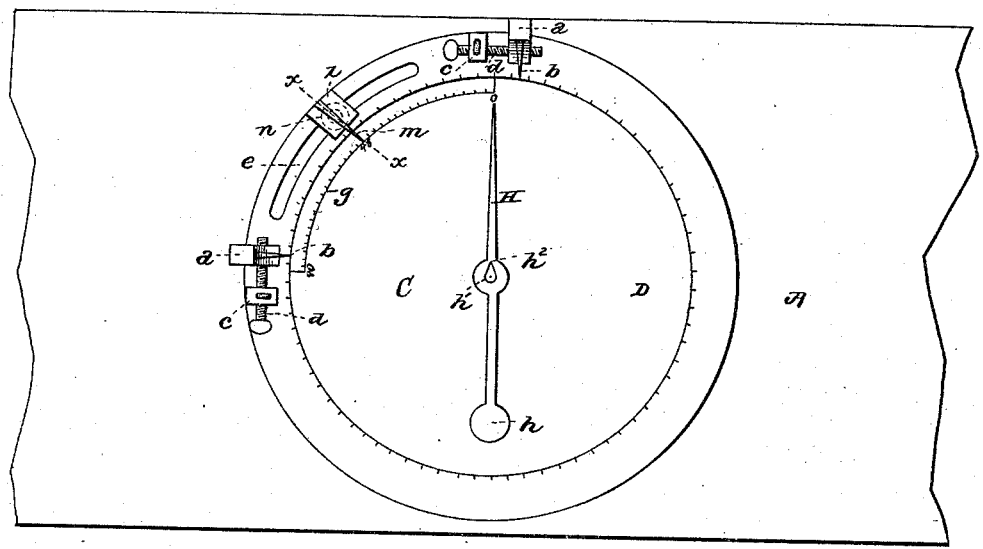
Figure 2:
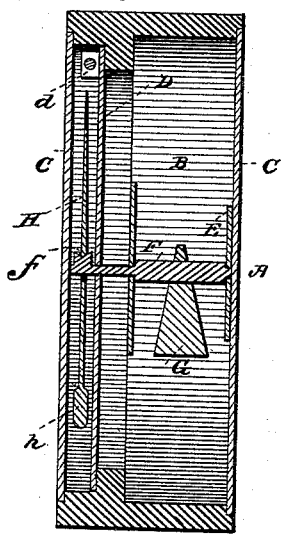
Figure 3:
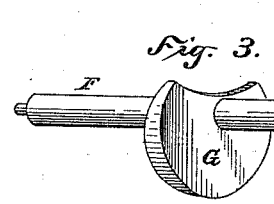
Figure 4:
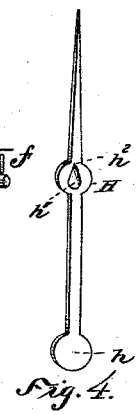
Figure 5:
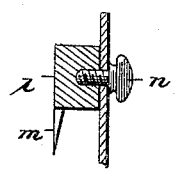

In the accompanying drawings, Figure 1 is a front elevation of a level embodying my invention. Fig. 2 is a vertical central transverse sectional view of the same. Fig. 3 is a detailed perspective view of the pivoted weighted shaft. Fig. 4 is a similar view of the indicator. Fig. 5 is a detailed sectional view taken on the line $x\ x$ of Fig. 1.

A represents a level through the center of which is made an opening, B. This opening is closed by the glass faces C. Near the front side of the level, in the opening, is secured a graduated dial, D, and across the opening, near the rear side of the level, extends a metallic cross-bar, E. A shaft, F, is journaled in the cross-bar and in the center of the dial, and is provided with a weight, G. The front end of the shaft projects beyond the dial and is flattened, and from the upper side of this flattened portion, at the outer end of the shaft, project vertical arms that form between them a V-shaped notch, $f$.

H represents an indicator or hand that is weighted at one end, as at $h$. A circular opening, $h'$, is made in the indicator at a suitable distance above the weighted end thereof, and in the upper side of this opening is formed an inverted V-shaped notch, $h^2$. The projecting end of the weighted shaft passes through the opening $h'$ of the indicator, and the notch $h^2$ of the indicator rests in the notch $f$ of the shaft, and thus the indicator is pivoted upon the shaft with such nicety that the indicator is sensitive to the slightest movement of the level.

I am aware that levels have been heretofore constructed with weighted shafts, to which indicator-hands have been attached for sweeping around the dial, and this, broadly, I disclaim. In the levels heretofore constructed the indicator-hand has been rigidly secured to the weighted shaft. Owing to the friction of the weighted shaft upon its bearings the levels heretofore constructed have not been sufficiently sensitive to indicate very slight movements of the level, and this defect it is the object of my invention to overcome. By pivoting the weighted shaft in the level, and by pivoting the weighted indicator upon the shaft, I provide an instrument that can be used where great accuracy is necessary. In order to guard against displacements of the dial, which would affect the accuracy of the level, I secure to the level, at about ninety degrees apart, two fixed blocks, $a$, each of which has a needle-point, $b$. The dial is marked into degrees near its outer edge, and to its face are secured lugs $c$, through which extend swiveled set-screws $d$, that enter the blocks $a$. The needle-points $b$ indicate when the dial is in correct position. Should the dial become shifted out of place, the set-screws $d$ can be turned so as to shift it back again, and thus the accuracy of the level can be maintained unimpaired. A curved slot, $e$, is made in the dial, extending between the blocks $a$, and a quarter-circular scale, $g$, is marked on the dial representing ninety degrees. An adjustable block, $l$, having a needle-point, $m$, is secured to the dial by a set-screw, $n$, that extends through the slot $e$ from the rear side of the dial and enters the block $l$. By means of this screw the block $l$ can be adjusted in the slot so as to cause the needle-point $m$ to indicate any desired degree that may be wanted.

Having thus described my invention, I claim—

1. The combination, in a level, of a pivoted weighted shaft, a dial, and a weighted indicator-hand that is pivoted independently upon the pivoted weighted shaft, substantially as described.

2. The combination, in a level, of a pivoted weighted shaft having a notch on its upper side, a dial, and a weighted indicator-hand that is pivoted upon the weighted shaft in the notch thereof, substantially as described.

3. The combination, in a level, of a pivoted weighted indicator-hand, a shifting dial, and screws for shifting the dial, for the purpose set forth, substantially as described.

4. The combination, in a level, of a pivoted weighted indicator-hand and the dial having the scale $g$, and the adjustable indicator-point $m$, substantially as described.

In testimony that I claim the foregoing as my own I have hereto affixed my signature in presence of two witnesses.

STEPHEN JAMES DECKARD.

Witnesses:
J. C. FITZGERALD,
CHAS. B. QUEALY.